United States Patent
Takada et al.

(10) Patent No.: US 8,466,648 B2
(45) Date of Patent: Jun. 18, 2013

(54) MOTOR CONTROL DEVICE AND OUT-OF-STEP DETECTING METHOD

(75) Inventors: Kazuo Takada, Nagano (JP); Takayuki Matsui, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 97 days.

(21) Appl. No.: 13/172,206

(22) Filed: Jun. 29, 2011

(65) Prior Publication Data

US 2012/0001584 A1 Jan. 5, 2012

(30) Foreign Application Priority Data

Jul. 2, 2010 (JP) .................................. 2010-152193

(51) Int. Cl.
*H02P 8/38* (2006.01)
*H02P 6/18* (2006.01)
*H02P 8/00* (2006.01)

(52) U.S. Cl.
USPC ................... 318/400.34; 242/422.2; 242/421; 324/177; 324/765.01

(58) Field of Classification Search
USPC ............... 318/400.35, 400.05, 599, 685–696, 318/400.34
See application file for complete search history.

(56) References Cited

U.S. PATENT DOCUMENTS

| | | | | |
|---|---|---|---|---|
| 5,652,525 A | * | 7/1997 | Mullin et al. | 324/765.01 |
| 7,183,734 B2 | * | 2/2007 | Lassen | 318/400.34 |
| 7,288,956 B2 | | 10/2007 | De Cock et al. | |
| 8,174,223 B2 | * | 5/2012 | Takada et al. | 318/400.34 |
| 2008/0238349 A1 | * | 10/2008 | Cheng | 318/400.05 |
| 2008/0298784 A1 | * | 12/2008 | Kastner | 388/811 |
| 2009/0256515 A1 | | 10/2009 | Takada et al. | |

FOREIGN PATENT DOCUMENTS

| | | |
|---|---|---|
| EP | 1 460 757 A1 | 9/2004 |
| JP | 2009-261045 A | 11/2009 |

\* cited by examiner

*Primary Examiner* — Bentsu Ro
*Assistant Examiner* — Said Bouziane
(74) *Attorney, Agent, or Firm* — Carrier Blackman & Associates, P.C.; William D. Blackman; Joseph P. Carrier (57) ABSTRACT

A motor control device for a stepping motor including at least two phase coils and a rotor is provided. The motor control device includes a control unit which applies a pulse voltage subjected to pulse width modulation, to each of the at least two phase coils, a back electromotive voltage measuring unit which provides a halt period to temporarily halt the application of the pulse voltage to one of the phase coils when a direction of the coil current flowing in the one phase coil is switched, and which measures a back electromotive voltage induced in the one phase coil during the halt period, an out-of-step detecting unit which detects an out-of-step of the stepping motor if the measured back electromotive voltage satisfies a predetermined criterion, and a voltage control unit which sets a voltage for all phase coils other than the one phase coil to a constant voltage during the halt period.

5 Claims, 7 Drawing Sheets

MOTOR CONTROL DEVICE AND OUT-OF-STEP DETECTING METHOD

BACKGROUND OF THE INVENTION

Field of the Invention

The invention relates to a motor control device and an out-of-step detecting method, and more particularly, to a motor control device and an out-of-step detecting method for a stepping motor.

EP 1460757 A describes a technique which provides a halt period to halt supply of a control signal by a time period which is short enough not to influence rotation of a stepping motor within each step unit period of the control signal of the stepping motor, and measures a back electromotive voltage induced in a coil during the halt period, thereby detecting an out-of-step of the stepping motor.

JP 2009-261045 A describes a technique which detects an out-of-step while making it possible to use a stepping motor at the maximum torque in the technique described in EP 1460757 A. The technique of JP 2009-261045 A uses a means for applying a control current or a control voltage to each phase coil so as to drive the stepping motor having an N phase coil, and a means for separately measuring a back electromotive voltage induced in each phase coil. In the technique of JP 2009-261045 A, the application of the control current or the control voltage to the each phase coil is halted by turns phase by phase from a predetermined timing within one step period of a rotor of the stepping motor for such a short period so as not to influence the rotation of the stepping motor, and the out-of-step of the stepping motor is detected on the basis of a measurement result of the back electromotive voltage induced in the coil, to which the application is halted. Specifically, in a case where the measurement result of the back electromotive voltage induced in at least one phase coil satisfies a predetermined out-of-step determination criterion, the out-of-step is detected.

Figure 6A:
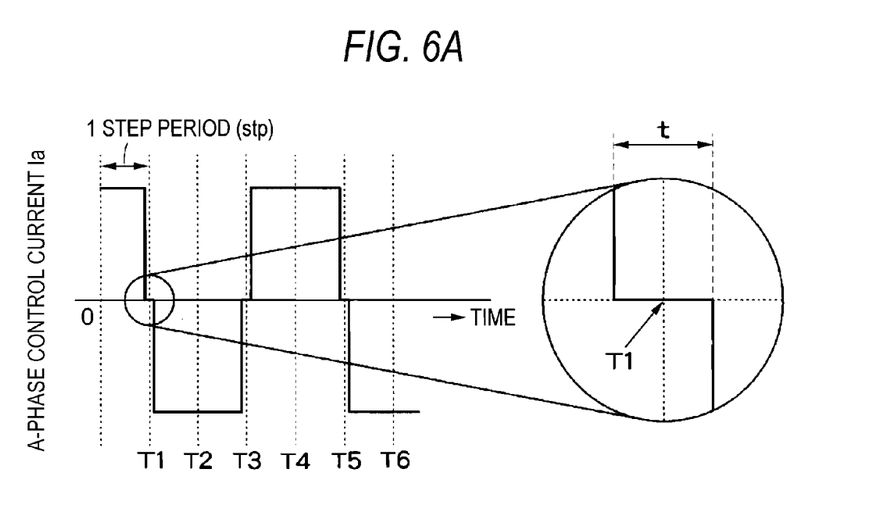
FIGS. 6A and 6B are schematic diagrams for explaining a related-art out-of-step detecting process.
Figure 6B:
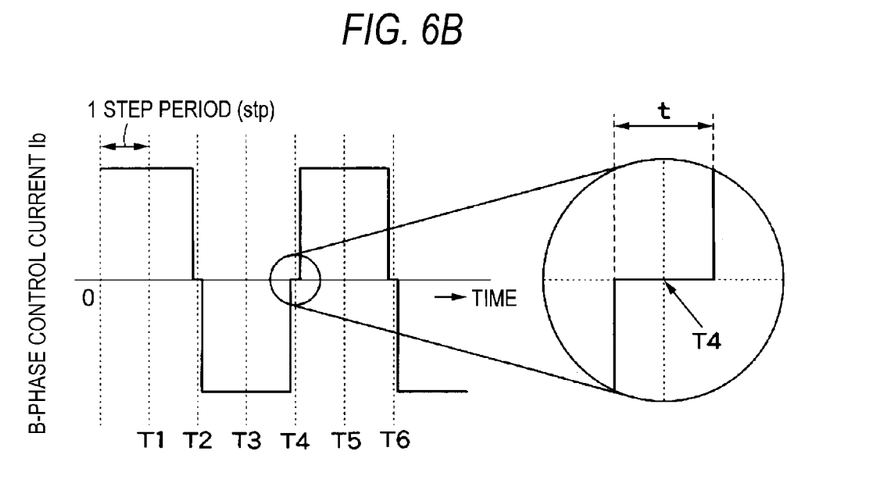
Figure 7:
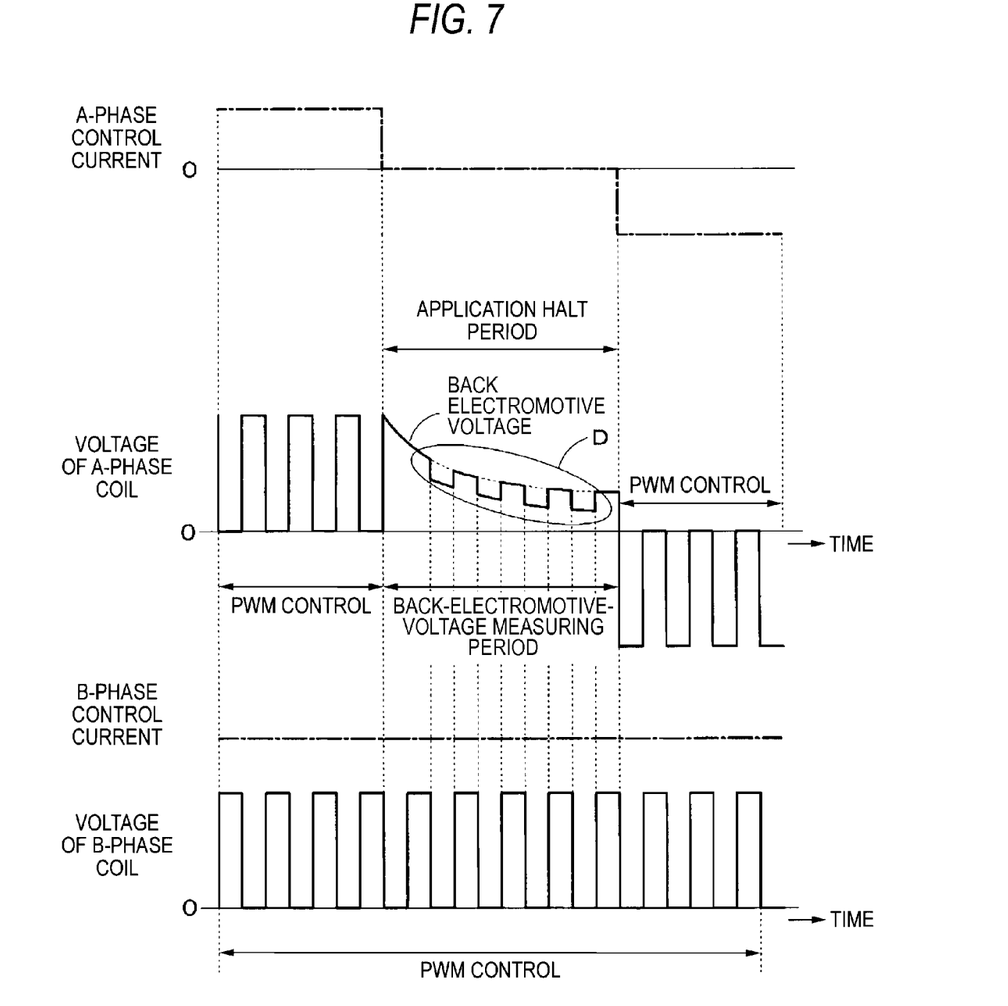
FIG. 7 is a schematic diagram for explaining a related-art out-of-step detecting process.

However, the technique of JP 2009-261045 A has the following problems. As shown in FIGS. 6A and 6B, in JP 2009-261045 A, even when the application of the control voltage to an A-phase coil (the coil, to which the application of the control voltage is halted) is halted, the application of the control voltage to a B-phase coil (the coil, to which the application of the control voltage is continued) is performed by pulse width modulation (hereinafter, referred to as PWM). Herein, a noise generated when the voltage application performed by the PWM is switched on or off is superimposed on the waveform of the back electromotive voltage of the A-phase coil, to which the application is halted (see an ellipsoidal portion D of FIG. 7). Therefore, when the voltage of the A-phase coil is measured, it is difficult to accurately measure the back electromotive voltage induced in the A-phase coil. As a result, an erroneous detection occurs in detecting the out-of-step of the stepping motor.

SUMMARY OF THE INVENTION

According to an illustrative embodiment of the present invention, there is provided a motor control device for a stepping motor including at least two phase coils, in which coil currents having different phases flow, respectively, and a rotor configured to rotate by periodically switching a phase of the coil current flowing in each phase coil. The motor control device includes: a control unit which applies a pulse voltage subjected to pulse width modulation, to each of the at least two phase coils of the stepping motor; a back electromotive voltage measuring unit which provides a halt period to temporarily halt the application of the pulse voltage to one of the phase coils when a direction of the coil current flowing in the one phase coil is switched, and which measures a back electromotive voltage induced in the one phase coil during the halt period; an out-of-step detecting unit which detects an out-of-step of the stepping motor if the measured back electromotive voltage satisfies a predetermined out-of-step determination criterion; and a voltage control unit which sets a voltage for all phase coils other than the one phase coil, for which the back electromotive voltage is measured, to a constant voltage during the halt period.

In the above motor control device, the voltage control unit may set a voltage level of the constant voltage to a power-supply voltage level or a ground (GND) level, for the all other phase coils.

In the above motor control device, the voltage control unit may set the constant voltage to be applied to the all other phase coils during the halt period, to a predetermined reference voltage level.

According to another illustrative embodiment of the present invention, there is provided an out-of-step detecting method for a stepping motor including at least two phase coils, in which coil currents having different phases flow, respectively, and a rotor configured to rotate by periodically switching a phase of the coil current flowing in each phase coil. The method includes: applying a pulse voltage subjected to pulse width modulation to each of the at least two phase coils of the stepping motor; providing a halt period to temporarily halt the application of the pulse voltage to one of the phase coils when a direction of the coil current flowing in the one phase coil is switched, and measuring a back electromotive voltage induced in the one phase coil during the halt period; detecting an out-of-step of the stepping motor if the measured back electromotive voltage satisfies a predetermined out-of-step determination criterion; and setting a voltage for all phase coils other than the one phase coil, for which the back electromotive voltage is measured, to a constant voltage during the halt period.

In the above out-of-step detecting method, in the setting step, a voltage level applied to the all other phase coils during the halt period may be maintained at a voltage level applied immediately before the halt period.

In the above out-of-step detecting method, in the setting step, the constant voltage to be applied to the all other phase coils during the halt period may be set to a predetermined reference voltage level.

According to the above configuration, it is possible to detect the out-of-step of the stepping motor with a high degree of accuracy.

DETAILED DESCRIPTION

Hereinafter, illustrative embodiments of the present invention will be described in detail with reference to the accompanying drawings.

Figure 1:
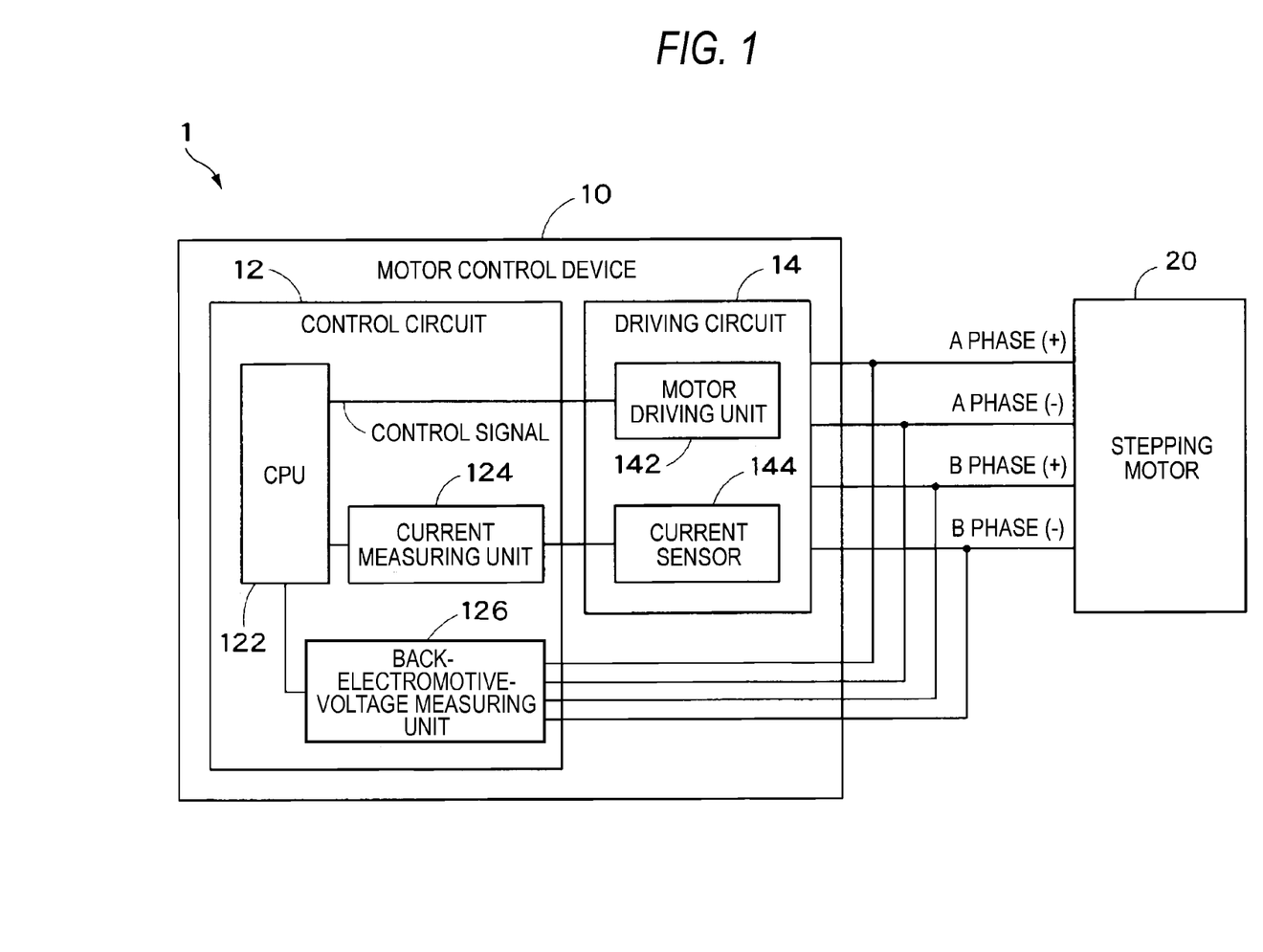
FIG. 1 is a block diagram illustrating a configuration of a stepping motor system 1 according to an illustrative embodiment of the present invention.

A stepping motor system according to an illustrative embodiment of the present invention will be described. FIG. 1 is a block diagram illustrating a configuration of a stepping motor system 1 according to an illustrative embodiment of the present invention.

As shown in FIG. 1, the stepping motor system 1 includes a motor control device 10 and a stepping motor 20. The motor control device 10 is a module for controlling the stepping motor 20. The stepping motor 20 is a two-phase stepping motor which is driven by excitation of two phases of an A phase and a B phase. For example, the stepping motor 20 is used as an actuator for an automotive air conditioner.

The motor control device 10 includes a control circuit 12 and a driving circuit 14. The control circuit 12 is a circuit for controlling the driving circuit 14. The control circuit 12 includes a central processing unit (hereinafter, referred to as CPU) 122, a current measuring unit 124, and a back electromotive voltage measuring unit 126. The driving circuit 14 is a circuit for driving the stepping motor 20. The driving circuit 14 includes a motor driving unit 142 and a current sensor 144.

The CPU 122 generates a processor which generates a control signal for controlling a voltage to be applied to the stepping motor 20, on the basis of a measurement result (to be described below) provided from the current measuring unit 124, and provides the generated control signal to the motor driving unit 142.

The current measuring unit 124 is a module which measures a current (hereinafter, referred to as coil current) flowing in each phase coil of the stepping motor 20, on the basis of a current sensing result (to be described below) provided from the current sensor 144, and provides the measurement result to the CPU 122.

The back electromotive voltage measuring unit 126 is a module which measures a back electromotive voltage induced in each phase coil of the stepping motor 20, and provides the measurement result to the CPU 122.

The motor driving unit 142 is a module which applies a voltage to each phase coil of the stepping motor 20, on the basis of the control signal provided from the CPU 122.

The current sensor 144 is a module which senses the coil current of the stepping motor 20 and provides the current sensing result to the current measuring unit 124.

Figure 2:
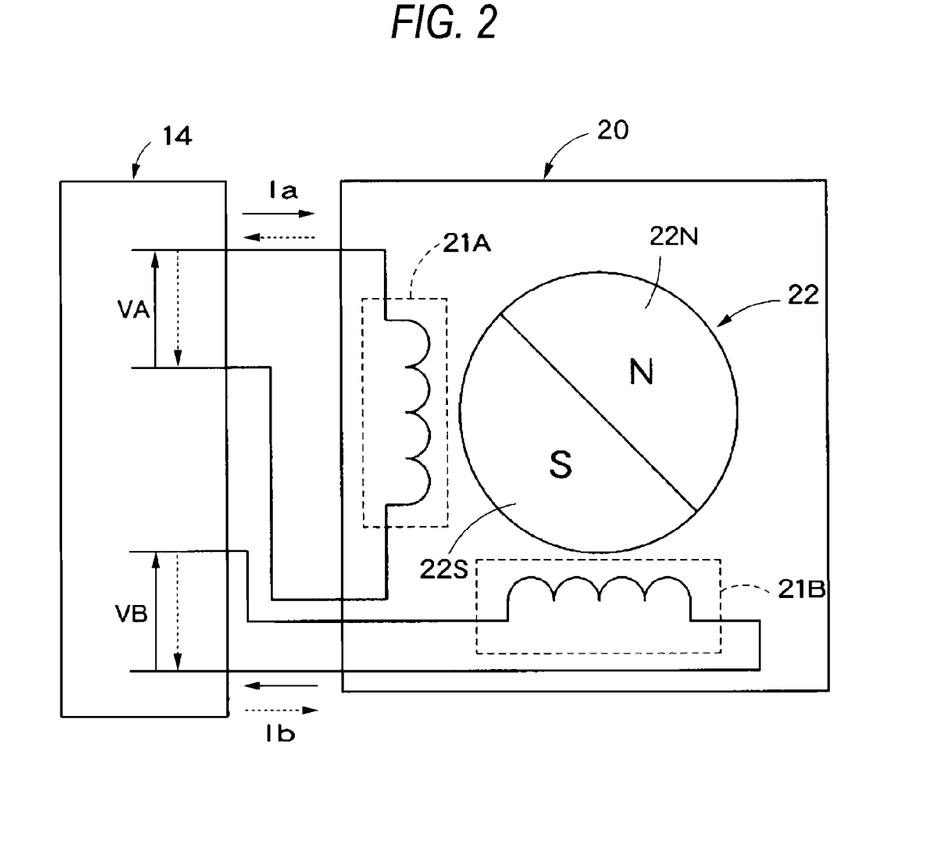
FIG. 2 is a circuit diagram illustrating a configuration of a stepping motor 20 of FIG. 1.

The stepping motor 20 will be described. FIG. 2 is a circuit diagram illustrating the stepping motor 20.

As shown in FIG. 2, the stepping motor 20 includes two coils 21A and 21B, a rotor 22, and a plurality of stator yokes (not shown).

Each of the coils 21A and 21B is a coil for exciting the stator yokes. Each of the coils 21A and 21B is connected to the driving circuit 14. The coil 21A is an A-phase coil. The coil 21B is a B-phase coil. In the coils 21A and 21B, coil currents having different phases flow, respectively.

The rotor 22 includes a multipolarly magnetized permanent magnet such that a south pole 22S and a north pole 22N are alternately reversed along a circumferential direction. The rotor 22 rotates by periodically switching the phases of the coil currents flowing in the individual phase coils (coils 21A and 21B).

The CPU 122 and the motor driving unit 142 operate as a control unit for applying a pulse voltage subjected to pulse width modulation to each of the coils 21A and 21B of the stepping motor 20. Hereinafter, the CPU 122 and the motor driving unit 142 are generally referred to as a control unit.

The back electromotive voltage measuring unit 126 provides a halt period to temporarily halt the application of the pulse voltage to one of the phase coils (coil 21A or 21B) when a direction of the coil current flowing in the coil is switched, and measures a back electromotive voltage induced in the one coil during the halt period.

Figure 3:
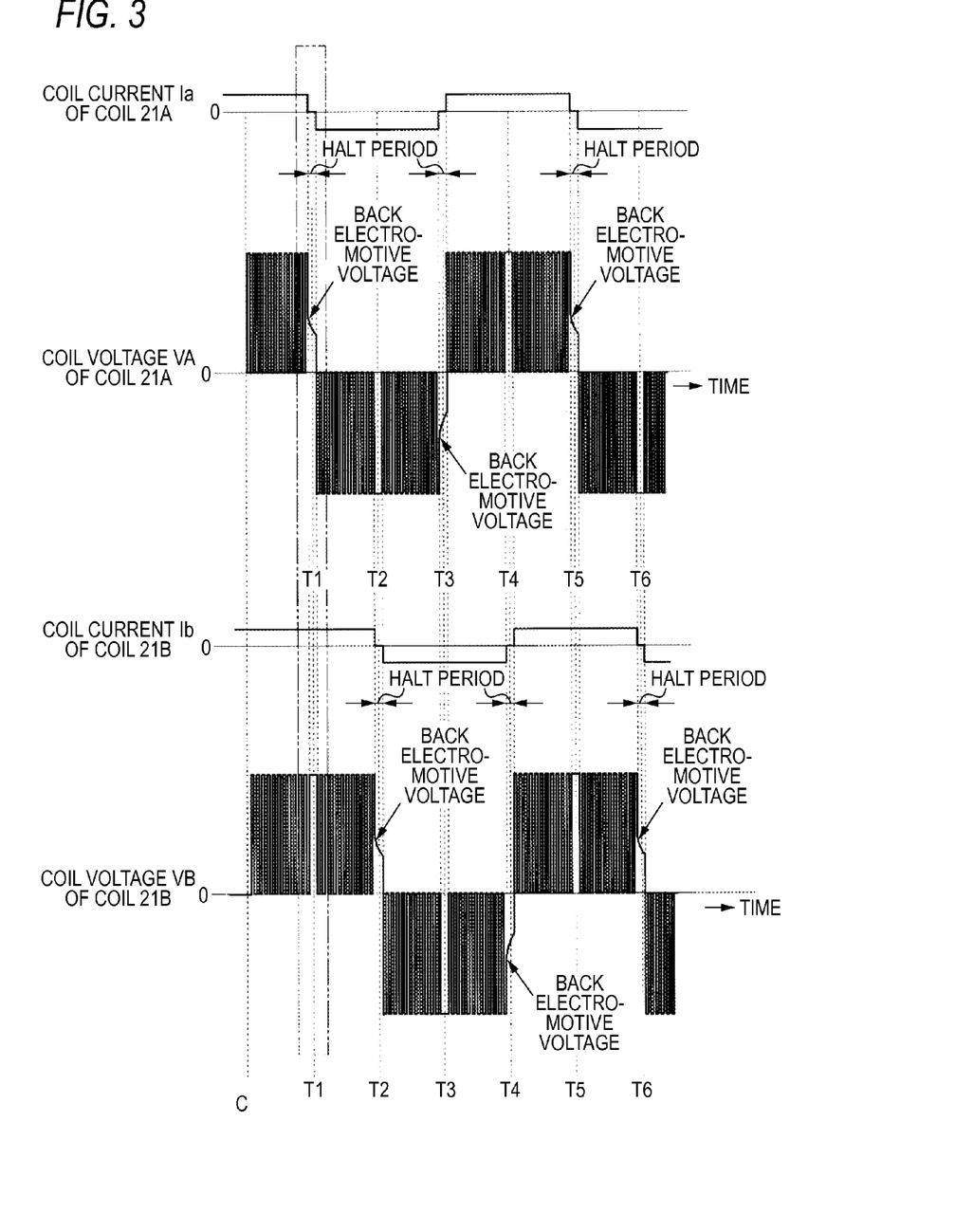
FIG. 3 is a schematic diagram illustrating a coil current Ia and coil voltage VA of a coil 21A of FIG. 2 and a coil current Ib and coil voltage VB of a coil 21B of FIG. 2.

An operation of the stepping motor 20 will be described. FIG. 3 is a schematic diagram illustrating a coil current Ia and coil voltage VA of the coil 21A and a coil current Ib of coil voltage VB of the coil 21B. In FIG. 3, areas filled with the coil voltages VA and VB show that pulse voltages having extremely small pulse widths are being applied to the coils 21A and 21B.

As described above, the pulse voltages are applied to the coils 21A and 21B by the control unit. The back electromotive voltages induced in the coils 21A and 21B during the halt period are measured by the back electromotive voltage measuring unit 126.

As shown in FIG. 3, the pulse voltage is applied to the coil 21A such that the polarity of the coil current Ia (that is, the direction of the coil current Ia) is switched by a predetermined period. When the polarity of the coil current Ia is switched, the halt period is provided to halt the application of the pulse voltage to the coil 21A such that the coil current Ia becomes zero. In the halt period, the back electromotive voltage is induced in the coil 21A.

Meanwhile, as shown in FIG. 3, the pulse voltage is applied to the coil 21B such that the polarity of the coil current Ib (that is, the direction of the coil current Ib) is switched by the same period as that of the coil 21A and later than the coil 21A by a predetermined phase. When the polarity of the coil current Ib is switched, the halt period is provided to halt the application of the pulse voltage to the coil 21B such that the coil current Ia becomes zero. In the halt period, the back electromotive voltage is induced in the coil 21B.

If the coil currents Ia and Ib flow in the coils 21A and 21B, respectively, the stator yokes of the coils 21A and 21B are excited according to the polarities of the coil currents Ia and Ib. Therefore, the rotor 22 rotates in predetermined step units.

Figure 4:
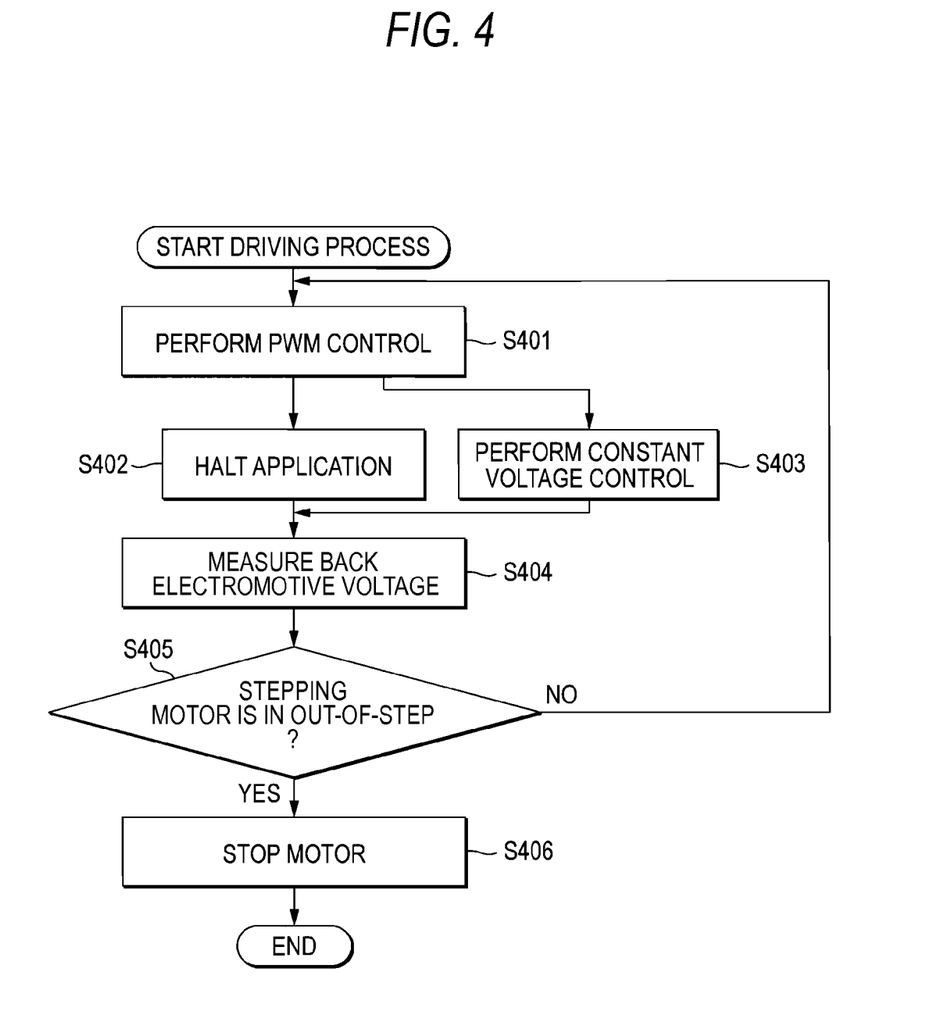
FIG. 4 is a flow chart illustrating a procedure of an out-of-step detecting process for a stepping motor according to an illustrative embodiment of the present invention.
Figure 5:
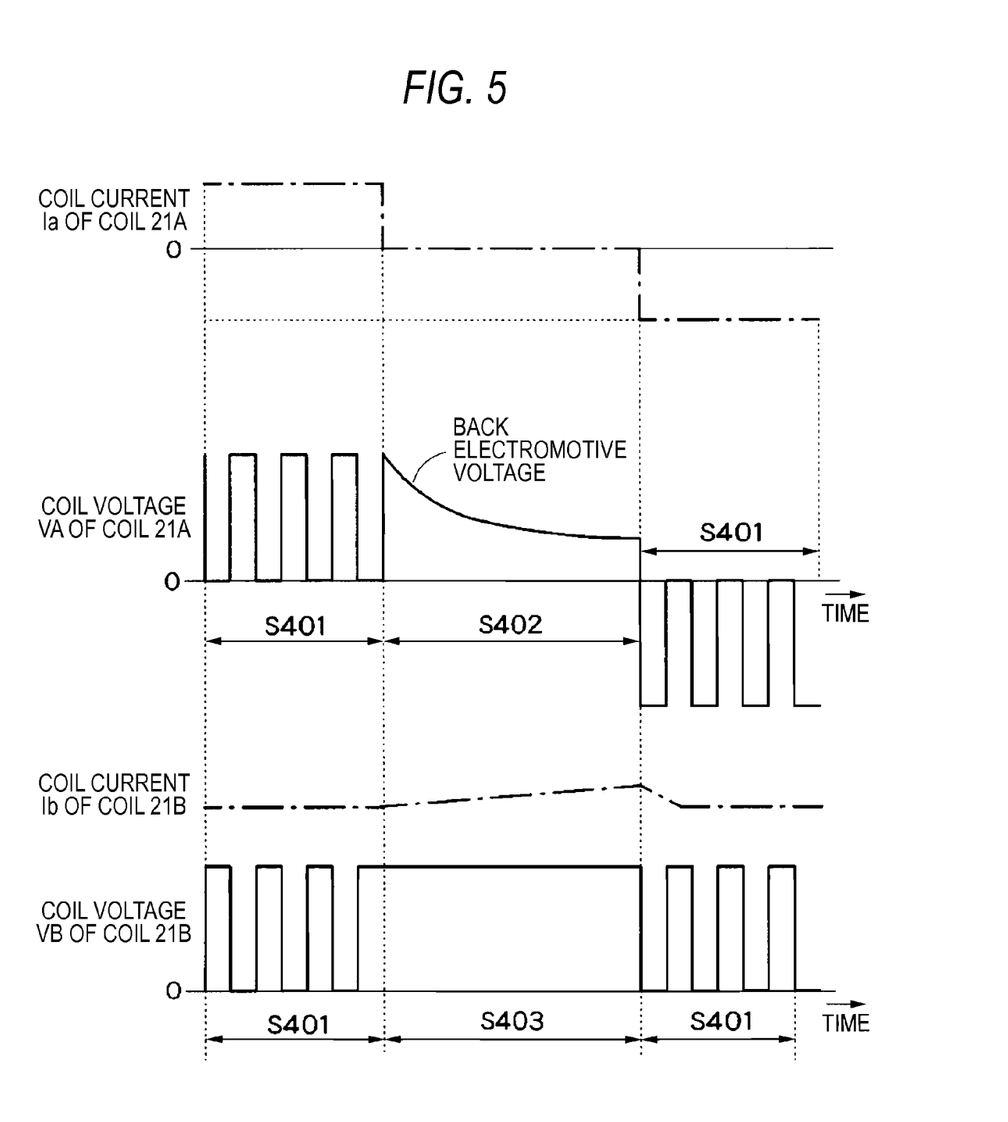
FIG. 5 is an enlarged view of a rectangular portion C of FIG. 3.

An out-of-step detecting method for a stepping motor according to an illustrative embodiment of the present invention will be described. FIG. 4 is a flow chart illustrating a procedure of a stepping-motor driving process according to an illustrative embodiment of the present invention. FIG. 5 is an enlarged view of a rectangular portion C of FIG. 3. Hereinafter, an example where the coil 21A of FIG. 2 is an object of back electromotive voltage measurement will be described.

The driving process of FIG. 4 is repeated from the time when the driving of the stepping motor 20 starts until the driving of the stepping motor 20 stops.

<Step S401: PWM Control>

The control unit applies the pulse voltages to the coils 21A and 21B. Therefore, the coil currents Ia and Ib flow in the coils 21A and 21B, respectively. After PMW control in step S401, application halt and constant voltage control are performed in steps S402 and S403, respectively.

<Step S402: Application Halt>

The control unit halts the application of the pulse voltage to the coil 21A during a predetermined halt period. Therefore, as shown in FIG. 5, the coil current Ia of the coil 21A becomes zero. The halt period is arbitrarily set by the CPU 122. For example, the CPU 122 itself may set a predetermined halt period, or may receive setting of the halt period from the outside of the stepping motor system 1.

<Step S403: Constant Voltage Control>

The control unit sets the coil voltage VB of the coil 21B to a constant voltage during the halt period. That is, in constant voltage control of step S403, the control unit operates as a voltage control unit which sets all other coil(s) (coil 21B) other than the coil, for which the back electromotive voltage is measured, to a constant voltage during the halt period. The voltage level of the constant voltage may be the same voltage level as the coil voltage VB of the coil 21B immediately before the halt period (that is, a power-supply voltage level or a ground (GND) level), and may be a predetermined reference voltage level. Therefore, as shown in FIG. 5, the coil voltage VB of the coil 21B becomes constant (at the power-supply voltage in the present illustrative embodiment). In this case, in the present illustrative embodiment, since the voltage level of the constant voltage is set to the power-supply voltage level, the coil current Ib of the coil 21B slightly increases as compared to the coil current Ib of the coil 21B in the PWM control in step S401. Since the coil voltage VB of the coil 21B is constant during the halt period, any noises due to the application of the coil voltage VB do not occur. As a result, any noises are not superimposed on the coil voltage VA of the coil 21A during the halt period. That is, the back electromotive voltage induced in the coil 21A is accurately measured by measuring the coil voltage VA of the coil 21A during the halt period. Therefore, it is possible to reduce or prevent an erroneous detection of an out-of-step.

<Step S404: Back Electromotive Voltage Measurement>

The back electromotive voltage measuring unit 126 measures the back electromotive voltage induced in the coil 21A during the halt period, and provides the measurement result to the CPU 122.

<Step S405: Out-of-Step Detection>

The CPU 122 determines whether the measurement result of the back electromotive voltage measuring unit 126 satisfies a predetermined out-of-step determination criterion. That is, in step S405, the CPU 122 operates as an out-of-step detecting unit which detects an out-of-step of the stepping motor 20 if the measured back electromotive voltage satisfies the predetermined out-of-step determination criterion. If it is determined that the measurement result of the back electromotive voltage measuring unit 126 satisfies the out-of-step determination criterion (that is, the out-of-step of the stepping motor 20 has been detected) (Yes in step S405), the motor stops in step S406. If it is determined that the measurement result of the back electromotive voltage measuring unit 126 does not satisfy the out-of-step determination criterion (that is, the out-of-step of the stepping motor 20 has not been detected) (No in step S405), the procedure returns to the PWM control in step S401.

<S406: Motor Stop>

The control unit stops the driving of the stepping motor 20 of FIG. 1. After the motor stops in step S406, the driving process ends.

In the above-described illustrative embodiment, the stepping motor 20 is a two-phase stepping motor, however, the present invention is not limited thereto. The inventive concept of the present invention is also applicable to a stepping motor having three or more phases. In this case, the application to one phase coil (having a phase, for which the back electromotive voltage is measured) is halted in step S402 of FIG. 4, and the constant voltage control is performed on all other coils other than the coil, for which the back electromotive voltage is measured, in step S403.

Further, in the above-described illustrative embodiment, the coil currents Ia and Ib are rectangular waves, however, the present invention is not limited thereto. The inventive concept of the present invention is also applicable to a case where the coil currents Ia and Ib are non-linear waves such as sinusoidal waves.

Furthermore, in the above-described illustrative embodiment, the CPU 122 and the motor driving unit 142 operate as the control unit, however, the present invention is not limited thereto. The inventive concept of the present invention is also applicable to a case where the control unit is implemented by a logic circuit. Moreover, the out-of-step detecting unit and the voltage control unit may be implemented by logic circuits.

According to the above-described illustrative embodiment, while the voltage application to a coil, for which the back electromotive voltage is measured is halted in step S402, constant voltage control is performed on the other coils in step S403. Therefore, noises caused by the application of the pulse voltages to the other coils are not superimposed on the coil voltage of the coil, for which the back electromotive voltage is measured. In measuring the back electromotive voltage in step S404, the back electromotive voltage induced in the coil, for which the back electromotive voltage is measured, can be accurately measured by measuring the coil voltage (that is, voltage without superimposed noises) of the coil, for which the back electromotive voltage is measured. In step S405, it is determined whether the measurement result of the back electromotive voltage measurement in step S404 satisfies the out-of-step determination criterion. Therefore, it is possible to detect an out-of-step of the stepping motor 20 with a high degree of accuracy.

Further, at least a portion of the motor control device 10 according to the illustrative embodiment of the present invention may be implemented by hardware or software. In a case where at least a portion of the motor control device 10 is implement by software, a program which implements the functions of the at least a portion of the motor control device 10 may be stored in a storage medium such as a flexible disk or a CD-ROM, and be read and executed in a computer. The recording medium is not limited to attachable/detachable media such as a magnetic disc and an optical disk, but may be a fixed storage medium such as a hard disk device and memory.

Also, the program which implements the at least a portion of the motor control device 10 according to the illustrative embodiment of the present invention may be distributed through a communication line such as Internet (including wireless communication). Moreover, the program may be encoded, modulated, or compressed, and then be distributed through a wire line such as Internet or a wireless line. Alternatively, the encoded, modulated, or compressed program may be stored in a medium and then be distributed.

What is claimed is:

1. A motor control device for a stepping motor including at least two phase coils, in which coil currents having different phases flow, respectively, and a rotor configured to rotate by periodically switching a phase of the coil current flowing in each phase coil, the motor control device comprising: a control unit which applies a pulse voltage subjected to pulse width modulation, to each of the at least two phase coils of the stepping motor; a back electromotive voltage measuring unit which provides a halt period to temporarily halt the application of the pulse voltage to one of the phase coils when a direction of the coil current flowing in the one phase coil is switched, and which measures a back electromotive voltage induced in the one phase coil during the halt period; an out-of-step detecting unit which detects an out-of-step of the stepping motor if the measured back electromotive voltage satisfies a predetermined out-of-step determination criterion; and a voltage control unit which sets a voltage for all phase coils other than the one phase coil, for which the back electromotive voltage is measured, to a constant voltage during the halt period, wherein the voltage control unit sets a voltage level of the constant voltage to one of a power-supply voltage level and a ground (GND) level, for the all other phase coils.

2. The motor control device according to claim 1, wherein the voltage control unit sets the constant voltage to be applied to the all other phase coils, to a predetermined reference voltage level.

3. An out-of-step detecting method for a stepping motor including at least two phase coils, in which coil currents having different phases flow, respectively, and a rotor configured to rotate by periodically switching a phase of the coil current flowing in each phase coil, the method comprising:

applying a pulse voltage subjected to pulse width modulation to each of the at least two phase coils of the stepping motor;

providing a halt period to temporarily halt the application of the pulse voltage to one of the phase coils when a direction of the coil current flowing in the one phase coil is switched, and measuring a back electromotive voltage induced in the one phase coil during the halt period;

detecting an out-of-step of the stepping motor if the measured back electromotive voltage satisfies a predetermined out-of-step determination criterion; and setting a voltage for all phase coils other than the one phase coil, for which the back electromotive voltage is measured, to a constant voltage during the halt period.

4. The out-of-step detecting method according to claim 3, wherein in the setting step, a voltage level applied to the all other phase coils during the halt period is maintained at a voltage level applied immediately before the halt period.

5. The out-of-step detecting method according to claim 3, wherein in the setting step, the constant voltage to be applied to the all other phase coils during the halt period is set to a predetermined reference voltage level.

\* \* \* \* \*